United States Patent [11] 3,593,320

United States Patent

[11] 3,593,320

[72] Inventor John D. Blades
Wayne, Pa.
[21] Appl. No. 705,480
[22] Filed Feb. 14, 1968
[45] Patented July 13, 1971
[73] Assignee Burroughs Corporation
Detroit, Mich.

[54] FIRST-IN, FIRST-OUT DATA BUFFER MEMORY
9 Claims, 4 Drawing Figs.

[52] U.S. Cl. .......... 340/174TF, 340/174 SR, 340/174 M, 340/174 MC
[51] Int. Cl. .......... G11c 5/08, G11c 11/14, G11c 19/00
[50] Field of Search .......... 340/174 M, 174 TF, 174

[56] References Cited

UNITED STATES PATENTS 3,230,515 1/1966 Smaller .......... 340/174
3,417,385 12/1968 Wolf .......... 340/174
3,191,162 6/1965 Davis .......... 340/174

*Primary Examiner*—Bernard Konick
*Assistant Examiner*—Steven B. Pokotilow
*Attorney*—Carl Fissell, Jr.

ABSTRACT: The present application discloses a data buffer memory system which receives information into one end and immediately propagates the information through the memory to its farthest coupled element. It thus provides the information at its output end in the same sequence as it was received. The key to the proposed memory system is a coupling/no coupling condition that can exist between two diplanar ferromagnetic thin films separated by a nonmagnetic conductive material. It is possible to fabricate the proposed memory matrix systems by multiple deposition techniques. High bit density may be achieved by standard or improved etching procedures.

INVENTOR.
JOHN D. BLADES
BY
ATTORNEY

INVENTOR.
JOHN D. BLADES
BY
Edward J. Feeney Jr.
ATTORNEY

INVENTOR.
JOHN D. BLADES
BY
Edward J. Feeney Jr.
ATTORNEY

FIRST-IN, FIRST-OUT DATA BUFFER MEMORY

CROSS REFERENCE TO A RELATED PATENT APPLICATION

The concept disclosed by the present application is closely associated with the material included in the disclosure of a copending patent application by the same inventor. The title of that application is "Coupled Film Content Addressed Memory," Ser. No. 693,305, filed Dec. 26, 1967, now U.S. Pat. No. 3,480,626, and that application is assigned to the same assignee as the present one. Also the contents of that application are incorporated into this application by this reference.

BACKGROUND OF THE INVENTION

1. Field of the Invention

The present invention generally relates to the field of magnetic storage devices. Such devices are usually organized in a sort of matrixlike configuration and while earlier memories utilized magnetic cores to form the matrix, many present day devices employ magnetic thin films as the storage elements.

2. Description of the Prior Art

In the past magnetic storage devices whether they utilized magnetic cores or magnetic thin films, usually were of a configuration wherein information which was entered in a particular sequence was read out in a reverse sequence. Thus, if binary information was entered as a one followed by a zero, then the stored information was read out as a zero followed by a one. This could be called a first-in, last-out memory and was necessary because as the information entered a sequence of serially connected bistable elements it proceeded sequentially into the memory. In addition, most prior matrix memories required connections within the matrix, whereas the present device utilizes only edge connections, which greatly simplifies the manufacture of this memory.

SUMMARY OF THE INVENTION

A successive data buffer register memory is proposed, as well as a matrixlike memory configuration. Both memories are of a first-in, first-out type and both utilize the coupling/no coupling condition that exists between two diplanar ferromagnetic thin films separated by a nonmagnetic conductive material. When the coupling exists between the two conventional magnetic films, the hysteresis loop of one of the films will have biased conditions.

It is therefore an object of the present invention to provide a first-in, first-out data buffer memory.

It is a further object to provide a first-in, first-out data buffer memory having a matrixlike configuration which utilizes only edge connections, thereby greatly facilitating its manufacture.

BRIEF DESCRIPTION OF THE DRAWINGS

In addition to those listed above, other objects will become apparent upon consideration of the remainder of this specification in conjunction with the accompanying drawings in which.

DETAILED DESCRIPTION OF THE INVENTION

Figure 1:
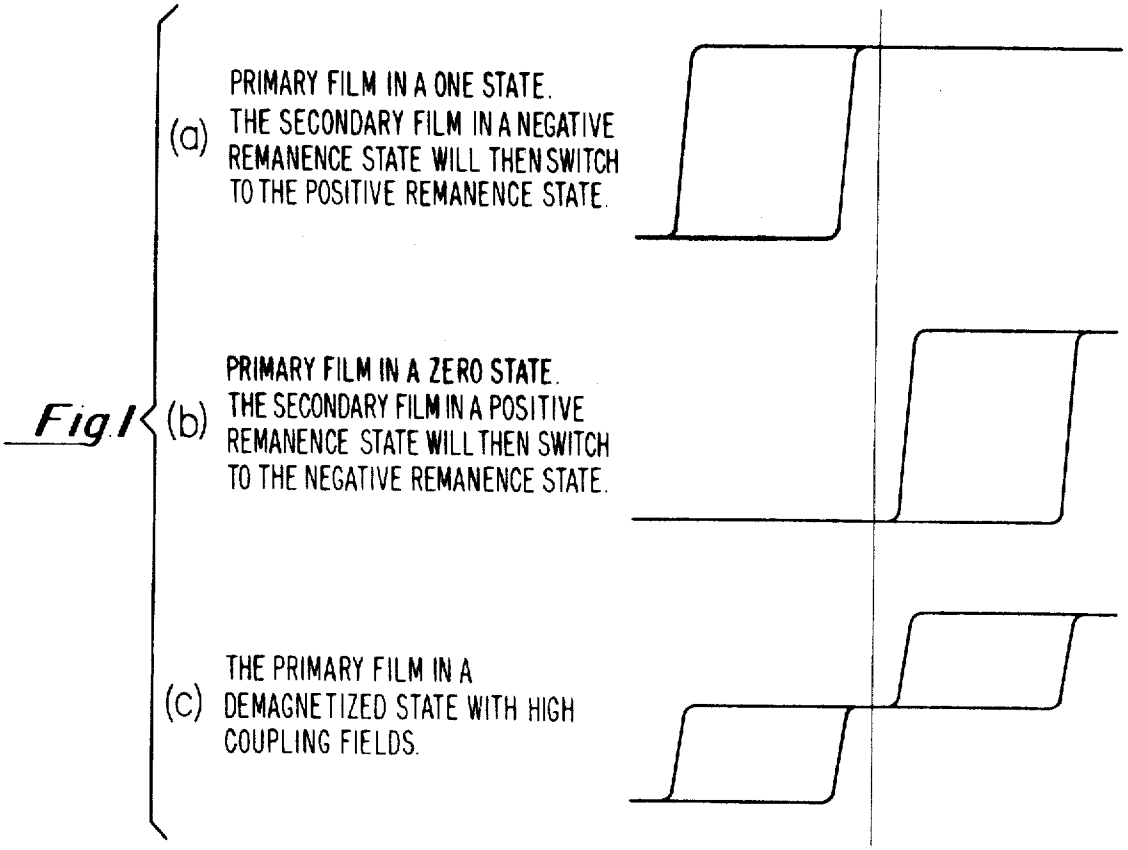
FIG. 1 includes *a*, *b* and *c* portions and illustrates the shift in the hysteresis loop of a coupled film due to the field exerted by exchange coupling.

If one of a pair of films (primary) has higher threshold energies than the other (secondary), an observation of the effective biasing can be attained as shown particularly in FIG. 1 which includes FIGS. 1*a*, 1*b*, and 1*c*. In FIG. 1*a*, the primary film is magnetized in a first remanent direction (arbitrarily called the ONE state) and the hysteresis loop of the secondary film is shifted to the left. When the primary film is magnetized in the opposite remanent condition (arbitrarily called the ZERO state), the secondary loop is biased by the amount of the exchange coupling to the right (FIG. 1*b*). In the event that the primary film is demagnetized (half the film in the ONE state and the other half in the ZERO state), then the shifted rectangular-type loop of FIG. 1*c* is observed. Exchange coupling depends upon the conductive state of the intermediate metallic layer. The use of a metal or alternately a semiconductor or even an insulator that can be energized to the conductive state makes feasible the switching on or off of the exchange coupling between the two diplanar magnetic layers (controlled magnetic tunneling).

An exchange-coupled pair of thin films becomes a propagating device when the effective biasing field of the first film is strong enough to shift the rectangular loop of the second film to the right or left of the zero applied field point of the B/H plot, $H_r$ $H_{r'}$, and with subsequent coupling causes a remanent condition in the second film, which condition corresponds in direction to the direction of the effective coupling field. A film in a positive (ONE state) remanent condition when coupled to a film in the opposite remanent (ZERO) state by the effective exchange-coupled biasing field will reverse the saturation magnetization in the latter film. The opposite situation occurs for the first film in the opposite remanent state. The unusual rectangular hysteresis loop (FIG. 1*c*) is obtained for the demagnetized primary condition and no propagation of information will occur by flux reversal.

The biased hysteresis loops shown in FIG. 1 have been observed on vacuum deposited diplanar magnetic thin films fabricated with an intermediate layer of Palladium.

Figure 2:
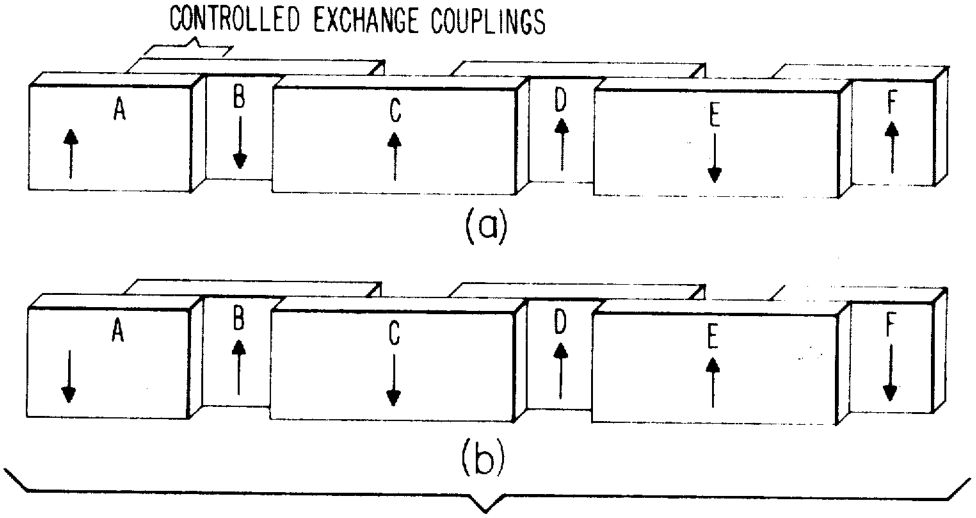
FIG. 2 includes *a* and *b* portions and pictorially illustrates a string of overlapping memory segments in an original and a shifted information condition.

FIG. 2*a* shown as arrangement of diplanar films with controllable exchange coupling for utilization as a successive data buffer memory. The overlapping areas of the diplanar films have an intermediate layer of material that will perform controlled exchange coupling, through applied energy at the individual material interfaces. Bit locations exist in the single layer areas.

Write-in occurs at the leftmost bit. With all bits coupled, information in a first direction of magnetization, denoted by an upward arrow and arbitrarily called a binary 1, written into A propagates to the rightmost bit F, which then decoupled. The next bit, which is in the opposite direction and denoted by a downward arrow, propagates to bit E which is next decoupled. Each succeeding information bit written in A propagates to the last-coupled on the right and subsequently that bit is decoupled. Operation continues in this manner until the entire row is full.

As shown in FIG. 2*b*, a Reading/Shift operation occurs when each bit is coupled sequentially, starting at the last bit to the right, F, and proceeding to the left to A. If the states of adjacent bits are opposite, coupling then causes magnetic switching to occur such that all information is shifted one bit to the right. A new bit can now be written in at the first bit location to the left. A sensing of the remagnetization of the last right-hand bit, F, presents an output signal. Readout and shift time will depend upon the length of the bit line.

Figure 3:
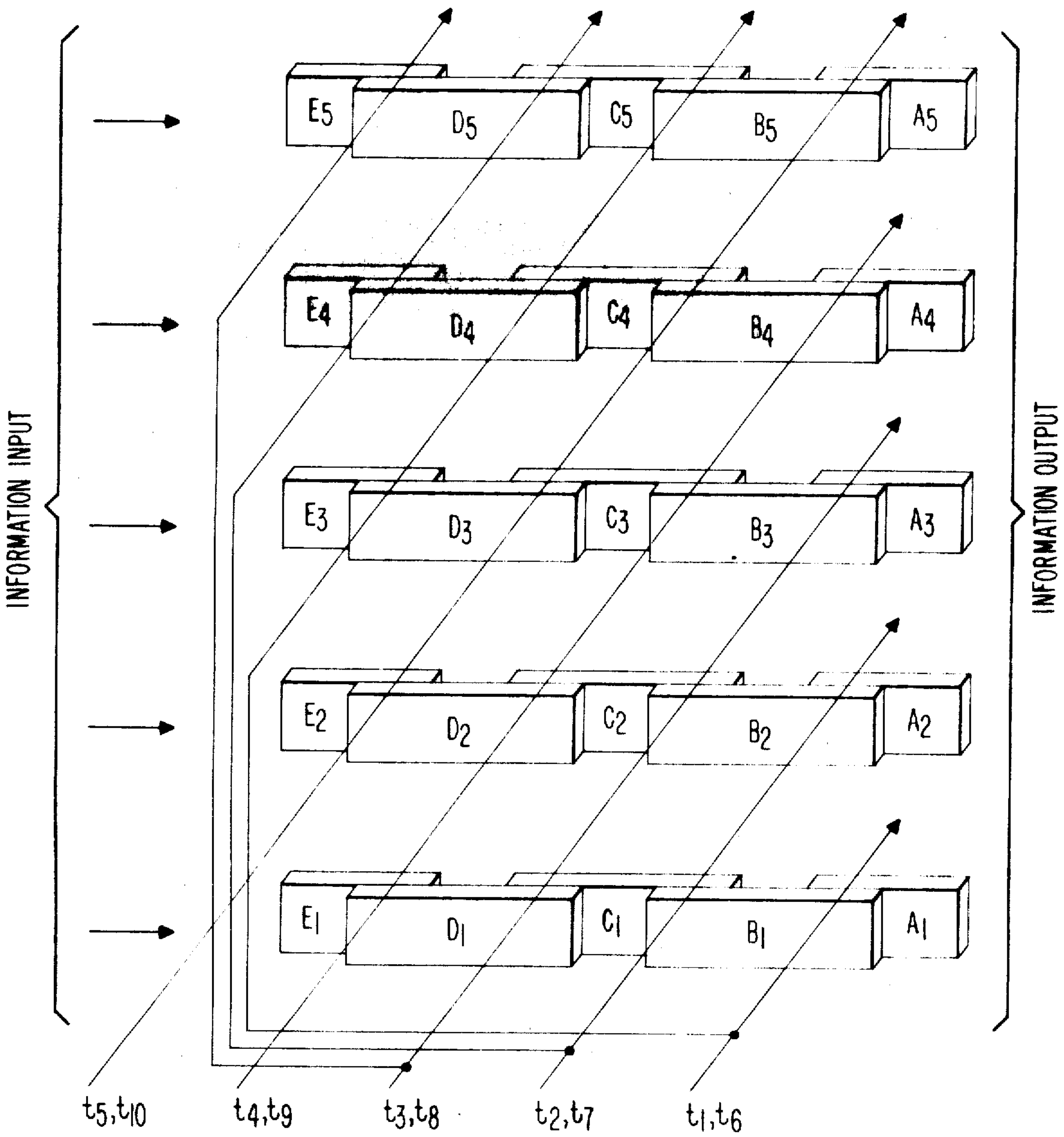
FIG. 3 is a pictorial diagram of the proposed data buffer memory matrix showing the diagonal control lines.

Readout time may be made independent of bit line length by constructing a square matrix of coupled bits with diagonal coupling lines. First-in data is then written in the lower right-hand portion of the matrix, shown in FIG. 3. The storage sequence is increased in a vertical direction. When a column is full, the next column is filled. By diagonalizing the coupling lines, data shifts will occur every time readout is obtained with the coupling condition.

Fabrication of the memory matrix system described above is feasible in terms of multiple deposition techniques. High bit density can be achieved by standard or improved etching procedures. Preliminary memory structures comprised matrix planar magnetic thin film arrays upon glass plates. A 3600-bit (character) system is easily obtained with a 60×60 matrix and associated circuitry on a 3-inch square glass plate. Major limitations on bit density are the demagnetizing fields in the narrow direction of the line and sense output voltages. It is important to realize that large structures (even three dimensional) of magnetic spin-oriented systems such as those initially described here have a tremendous potential in analoging neurological memory systems. Since outputs and inputs occur only at the edges, the "connection problem" is minimized. It is also important to realize that a considerable amount of design and utilization flexibility exists with the coupled magnetic film scheme. Furthermore data location registration can be achieved by magnetic sensing or counting techniques. An important advantage of the exchange-coupled memory scheme is the feasibility of a physical connection between data write energy and coupling/decoupling energy. If coupling energies are very small compared to reading output energies, then an energy gain will be achievable, the application ramifications of which are wide.

Referring again to FIG. 3, a matrixlike configuration is illustrated showing the diagonalized coupling lines with the matrix array of coupled magnetic elements.

Consider first a write-in operation wherein information is stored in the memory. Initially all of the coupling is activated to fully couple all of the elements of the entire memory. Following this activation, information bit $A_1$ enters at the left element on the bottom row of the memory at time $t_1$ and because of the fully coupled condition of the row, the bit is immediately propagated along the row to the location of $A_1$ at the right-hand end. The coupling of that element to the remainder of the row is then inactivated.

Thereafter, at time $t_2$ another information bit enters the fully coupled second row and is likewise propagated to the farthest right-hand element $A_2$. This element is then decoupled. Similarly bits are sequentially stored in locations $A_3$ through $E_5$ of the memory at times $t_3$ through $t_{25}$ and following the storage of each bit, the storing element is decoupled from the remainder of the row.

Finally, when the memory is fully occupied and each of the separate storage elements is completely decoupled from its neighbor, readout of the information may begin for the $A_1$—$A_4$ bits by coupling and decoupling the diagonal coupling areas sequentially in the following order: (1) the area between $A_1$ and $B_1$, (2) areas between $A_2$ and $B_2$ and $B_1$ and $C_1$, (3) $A_3$ and $B_3$, $B_2$ and $C_2$, and $C_1$ $D_1$, and (4) $A_4$ and $B_4$, $B_3$ and $C_3$, $C_2$ and $D_2$ and $D_1$ and $E_1$.

The data processing sequence will now be described as outlined in FIG. 4. Note that sequence 1 has already been stated.

Sequence of Data Processing

| | | |
|---|---|---|
| 1. Write in | $A_1 - E_5$ | Decoupling after each storage |
| 2. Next Couple then decouple | $A_1 - A_4$ | Readout $A_1 - A_4$ |
| 3. Write in $F_1$ | | |
| 4. Couple-decouple | $A_5$ – | Readout $A_5$ |
| 5. Write in $F_2$ | | |
| 6. Couple-decouple | $B_5$ and $B_1$ | Readout $B_1$ |
| 7. Write in $F_3$ | | |
| 8. Couple-decouple | $C_5$ and $B_2$ | Readout $B_2$ |
| 9. Write in $F_4$ | | |
| 10. Couple-decouple | $D_5$ and $B_3$ | Readout $B_3$ |
| 11. Write in $F_5$ | | |
| 12. Couple-decouple | $B_4$ | Readout $B_4$ |
| 13. Write in $G_1$ | | |
| 14. Couple-decouple | $B_5$ | Readout $B_5$ |
| 15. Write in $G_2$ | | |
| 16. Couple-decouple | $C_5$ and $C_1$ | Readout $C_1$ |
| 17. Write in $G_3$ | | |
| 18. Couple-decouple | $E_5$ and $C_2$ | Readout $C_2$ |
| 19. Write in $G_4$ | | |

Sequence of Data Processing—Continued

| | | |
|---|---|---|
| 20. Couple-decouple | $F_5$ and $C_3$ | Readout $C_3$ |
| 21. Write in $G_5$ | | |
| 22. Couple-decouple | $C_4$ | Readout $C_4$ |
| 23. Write in $H_1$ | | |

It is, of course, understood that this sequence may continue indefinitely.

Note that for every input there is an output and consequently the memory is a sequential first-in, first-out memory.

Assuming electrical energy is required at the exchange coupling areas for the control of coupling, conductor arrays can be associated with the magnetic matrix array such that with an associated switching system the correct sequence of coupling and decoupling can be achieved.

Figure 4:
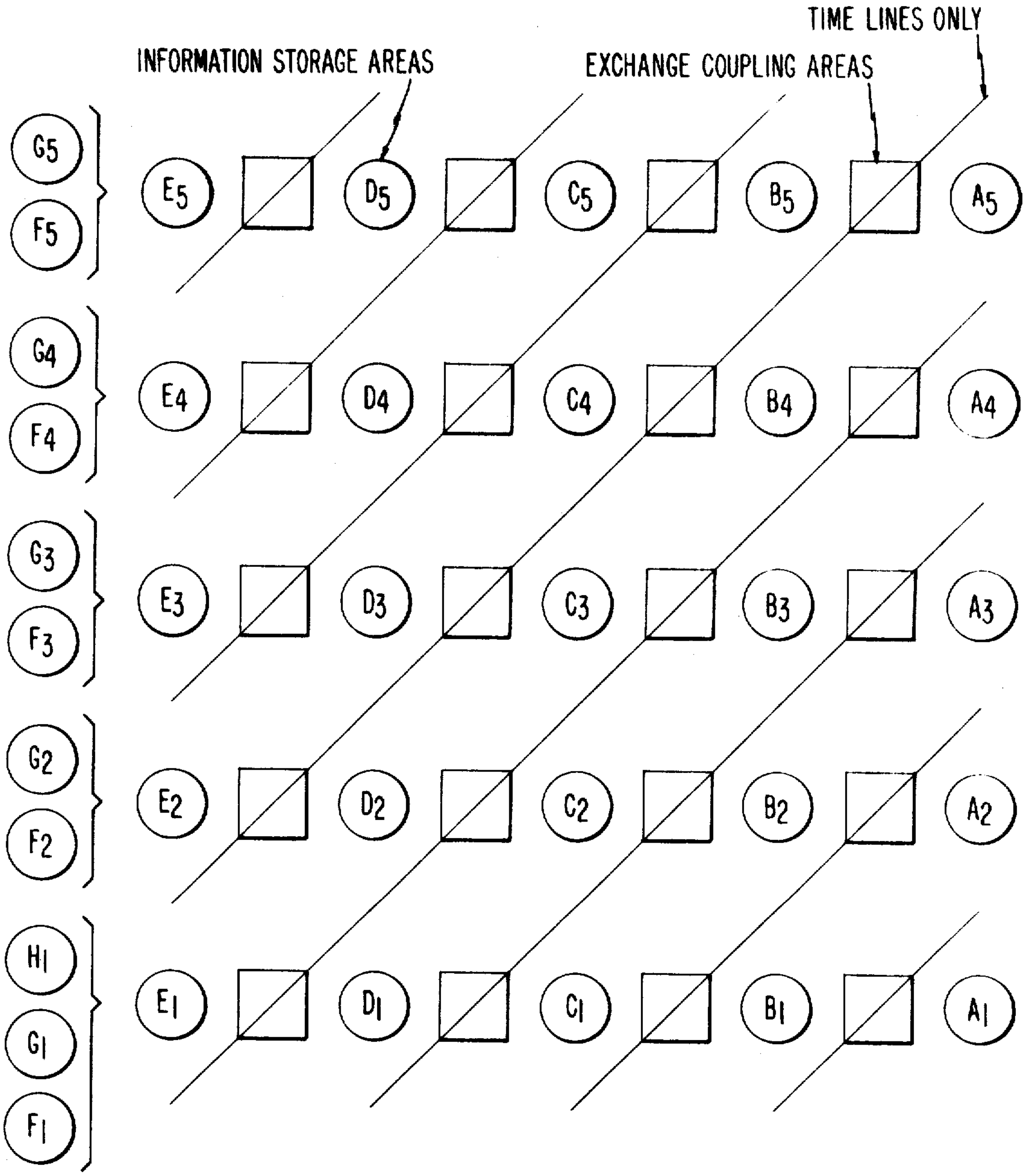
FIG. 4 is a similar diagram illustrating the passage of information through the memory matrix.

Conductors associated with the magnetic matrix elements of the left-hand column in FIG. 4 provide energy for writing input information while for the right-hand column elements another conductor can be so arranged as to receive induced sense voltages due to magnetic element flux changes and therefore provide a readout system.

As successive diagonal lines are activated, overlapped elements are coupled together and information bits are shifted through the memory. Thus at successive times the bits $A_1$ through $E_5$ are sequentially passed through the memory. Since it is readily evident that bit $A_1$ is not only first into the memory but also first out, it is seen that the present disclosure provides a buffer memory in which the sequence of the output information corresponds to the sequence of the input information. More simply, it is a first-in, first-out data buffer memory.

Obviously many modifications and variations of this invention are possible in the light of the above teachings. It is therefore to be understood that within the scope of the appended claims, the invention may be practiced other than as specifically described and illustrated.

What I claim is:

1. A successive data buffer memory comprising a plurality of overlapping thin film elements arranged in a serial string with a portion of each succeeding element overlapping a portion of a preceding one, a controllable exchange coupling means positioned between each of said successive overlapping portions, and a coupling control means connected to each of said overlapping portions, said coupling control means including means to simultaneously couple together said plurality of overlapping segments by applying energy at the individual material interfaces to thereby automatically propagate to the final coupled serial element, a signal received at the initial serial element, and including further means to sequentially decouple each overlapping segment afte. it has received a signal to be stored, said decoupling sequences recurring until all of said storage elements are full.

2. The successive data buffer memory as set forth in claim 1 wherein said controllable exchange coupling means is a nonmagnetic metallic layer deposited intermediate between said overlapping portions of said first and said second magnetic thin film elements.

3. The successive data buffer memory system as set forth in claim 1 wherein the nonoverlapped single layer areas of each of said thin film magnetic elements is a storage location for a single binary digit of information.

4. The successive data buffer memory as set forth in claim 1 wherein said thin film elements are vacuum-evaporated diplanar magnetic thin films fabricated with an intermediate layer of semiconducting material as the controllable exchange coupling means.

5. The successive data buffer memory as set forth in claim 4 wherein said intermediate layer material is an insulating material having controllable coupling characteristics when energized by a coupling energy source.

6. The successive data buffer memory as set forth in claim 1 wherein said memory further includes means for sequentially coupling and decoupling said memory elements in the same direction as that utilized in the original decoupling sequence to thereby read out said stored information in the same order in which it was stored.

7. The data buffer memory system as set forth in claim 6 including further means coupled to said memory system to sequentially supply binary information in bit by bit fashion for storage in said memory and including still further means in association with said memory for receiving information readout from said memory in the same sequential order as it has been stored to thereby provide a first-in, first-out data buffer memory system.

8. A data buffer memory system arranged in a matrix of $y$ rows and $x$ columns, each of said rows comprising a plurality of thin film elements arranged in a serial string with a portion of each succeeding element overlapping a portion of a preceding one, a plurality of controllable exchange coupling means individually positioned between each of said overlapping portions in each of said rows, a coupling control means including a plurality of exchange coupling readout control lines diagonally connected to the overlapping portions of the magnetic thin film elements in a manner such that information stored in said memory is sequentially read out of successive rows along the final column $x$ of said matrix.

9. The first-in, first-out data buffer memory system set forth in claim 8 wherein said means to sequentially supply information is coupled solely to said initial column in said matrix and said means for sequentially receiving information is coupled solely to said final column of said matrix.